March 7, 1944.   A. E. ROTHGARN   2,343,803
APPARATUS FOR DRY SEPARATION OF HEAVY MINERAL
PARTICLES FROM ORE MATERIAL
Filed March 21, 1941   4 Sheets-Sheet 1
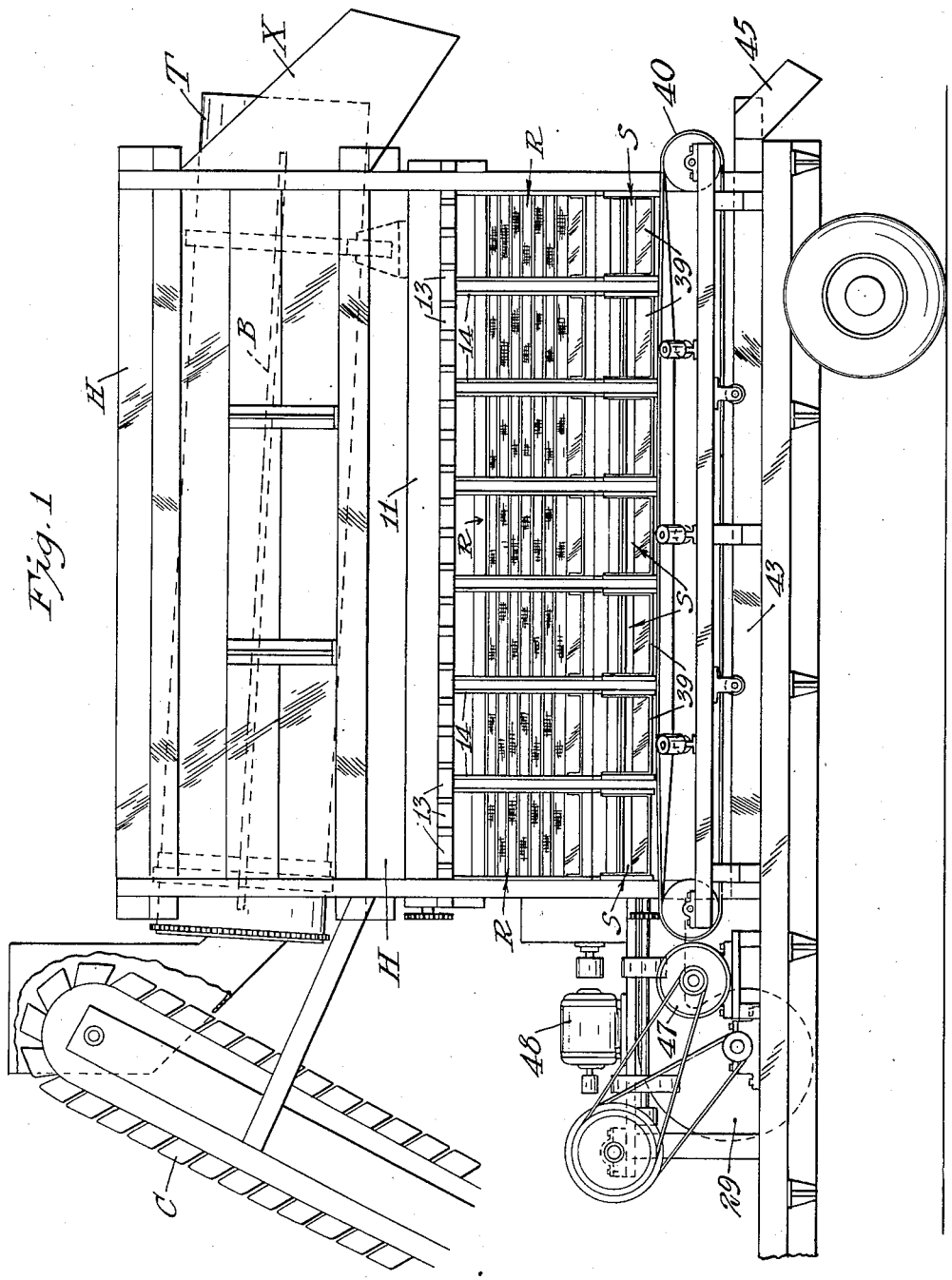
Inventor
Andrew E. Rothgarn
By Williamson + Williamson
Attorneys

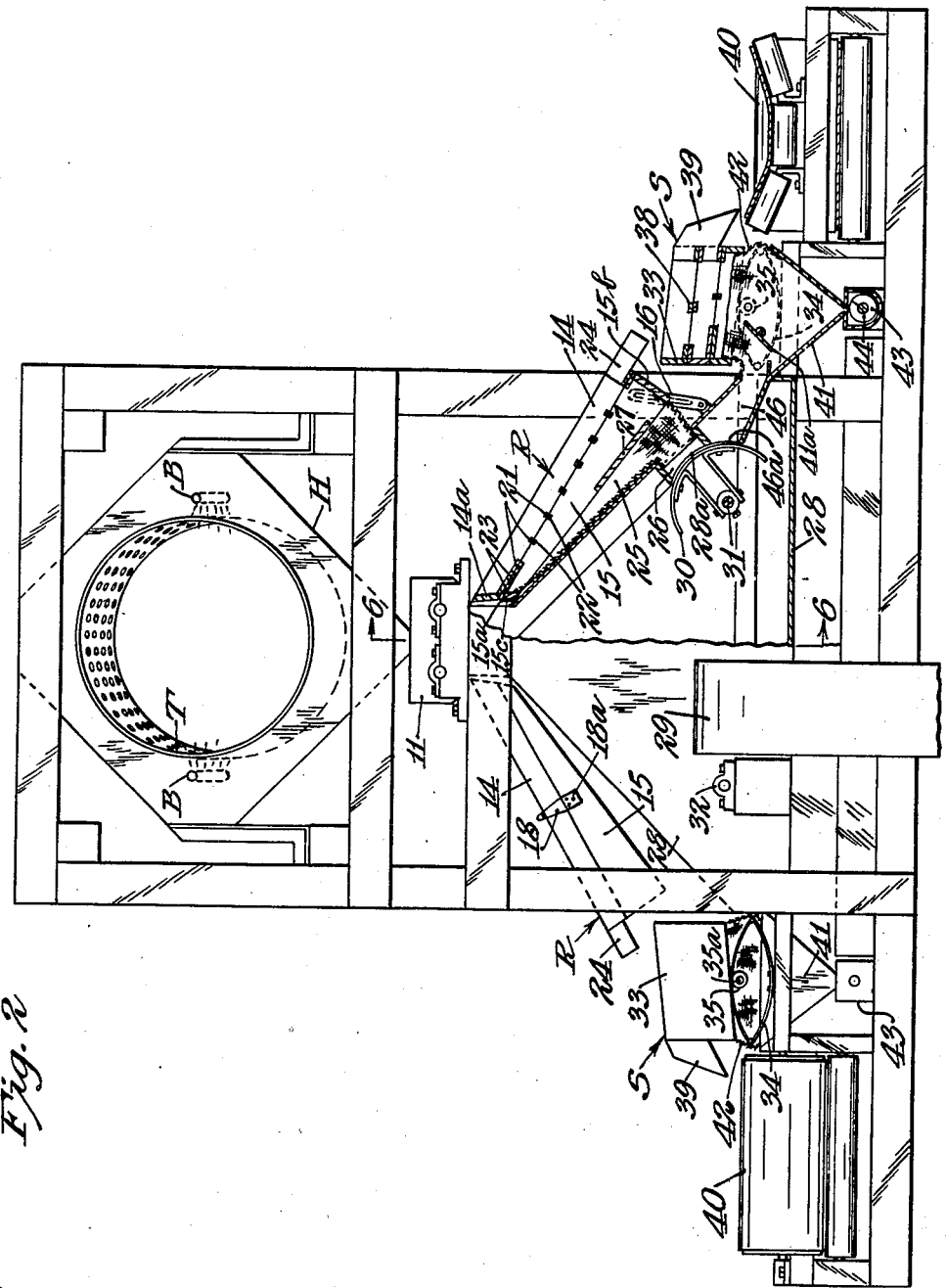

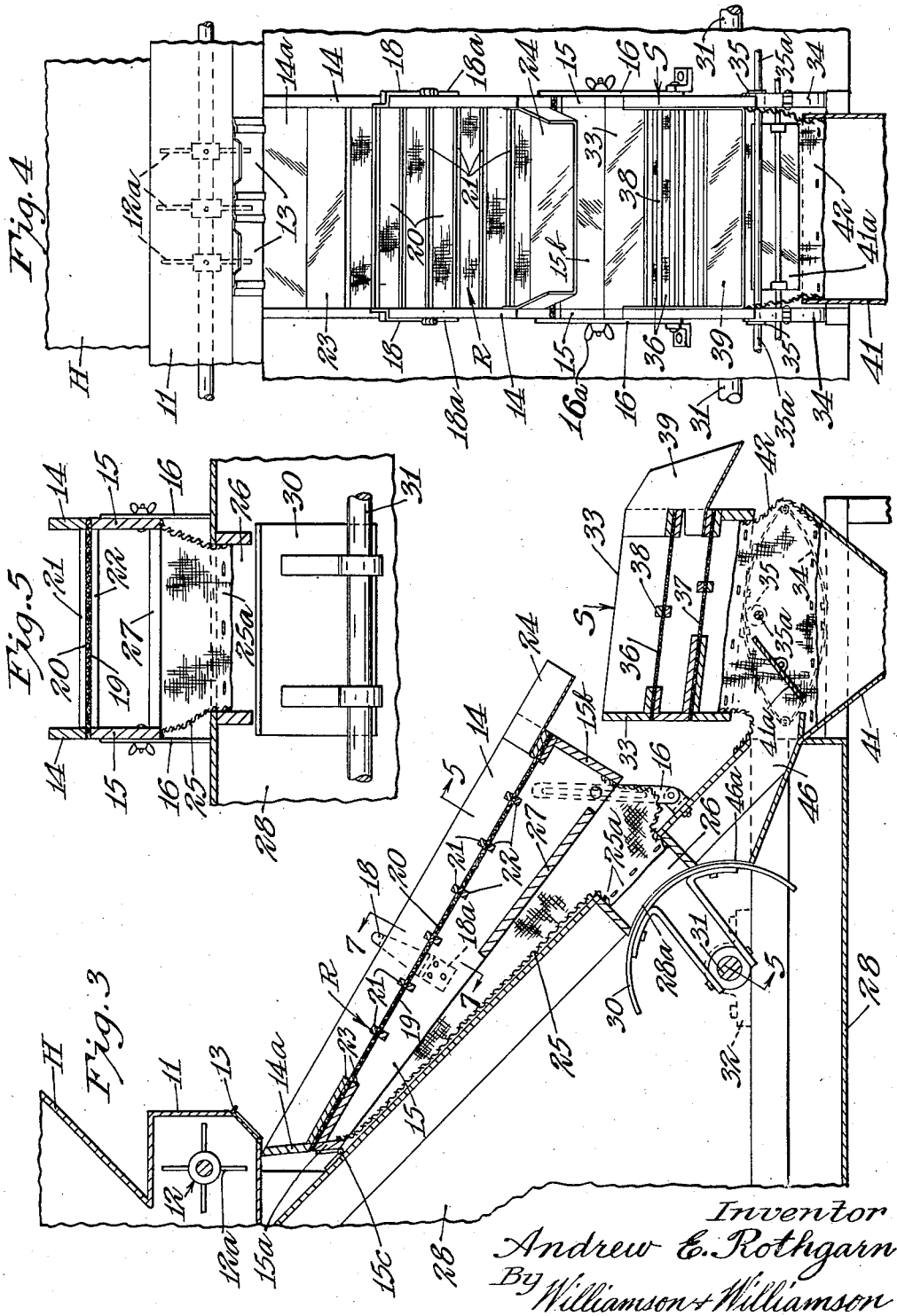

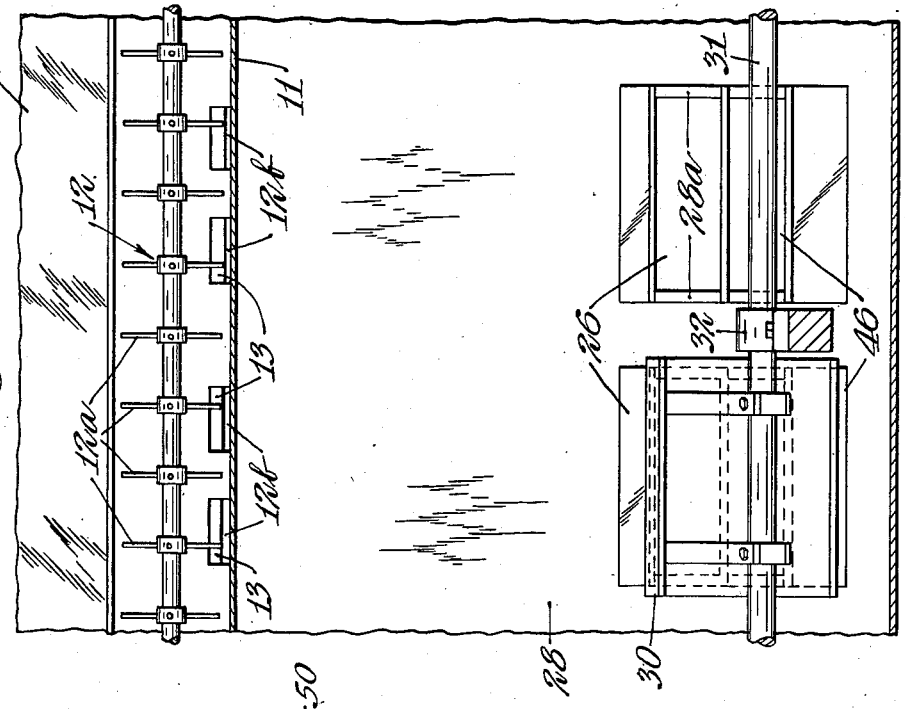

Patented Mar. 7, 1944

2,343,803

UNITED STATES PATENT OFFICE 2,343,803

APPARATUS FOR DRY SEPARATION OF HEAVY MINERAL PARTICLES FROM ORE MATERIAL

Andrew E. Rothgarn, Fresno, Calif.

Application March 21, 1941, Serial No. 384,450

2 Claims. (Cl. 209—475)

This invention relates to the dry separation or concentration of heavy mineral particles, such as gold, from broken up or loose ore material. The invention, while particularly applicable for separation of small particles of gold and gold flour from relatively dry earth materials containing the same, is adapted for separation or concentration of other heavy particles from lighter, relatively dry materials.

Many areas of land in the western part of the United States contain in the upper stratas of earth small amounts of gold in finely divided state. Where water has been available mining operations by placer method have been successful and profitable where the gold content of the land has been as low as 70¢ per cubic yard of earth. Many relatively large areas of land are available far removed from sources of water supply, and in many instances the gold content of such land is relatively high compared with sections which have been placer mined.

Various attempts at dry separation of the gold particles from such ore material through intermittent lifting, agitation and working of the earth materials have been made and such methods and apparatus have utilized in some instances air to assist in lifting and moving the lighter materials. Methods and apparatus heretofore utilized for dry separation, to my knowledge, have been inefficient and unsuccessful commercially because only a relatively small proportion of the total content of gold was separated off and because the substances separated off contained very large proportions of valueless earth materials.

In the previous methods and apparatus utilizing air in the separation operation, no true flotation or progressive movement of the valueless and lighter materials, to my knowledge, has been obtained. The application of air in such prior art tended to abruptly scatter and displace the finer and lighter materials including, however, a large amount of the small gold particles, but has not produced a substantial flow of the lighter valueless particles and materials over the heavy gold or other mineral particles desired to be retained.

It is an object of my present invention to provide an apparatus for obtaining a true flotation and downward flow of by far the greater part of the lighter and valueless earth materials while retaining substantially all of the gold or other heavy mineral particles and "flour."

More specifically, it is an object to so combine and control the intermittent application of air through a continuous, inclined porous riffle table as to produce an effective, substantially continuous wave-like flotation over said table and a series of spaced riffles provided thereon without scattering or abruptly dispersing of the fine, heavy particles, and with substantially complete recovery of such valuable particles with only a small proportion of valueless materials mixed therewith.

More specifically, it is an object to provide apparatus of the class described, wherein intermittently released air under pressure is directed through substantially the entire area of a riffle table rather than concentrated in narrow zones, with the resultant and new flotation principle and separation of a relatively concentrated recovery of mineral particles, as previously set forth.

Another object is the provision of air directing means beneath the inclined riffle tables having associated therewith air release valves which progressively increase to capacity, then progressively decrease the intermittent supply of air under pressure, thereby, with the other closely cooperating parts, producing the substantially continuous, wave-like flotation previously referred to.

Another object is to provide in apparatus of the class described, a shaker separating screen receiving from the delivery end of the main flotation table and supplied with controlled, intermittently released, upwardly directed currents of air for removing light materials and screening off larger pieces while collecting any finely divided, very heavy particles which may have not been retained by the main flotation separation unit.

These and other objects and advantages of my invention will more fully appear from the following description made in connection with the accompanying drawings, wherein like reference characters refer to the same parts throughout the several views, and in which:

Fig. 1 is a side elevation of a large commercial separating apparatus embodying my invention;

Fig. 2 is a view partly in elevation and partly in vertical section of the same, with the motors and driving connections removed to better show the important working elements of my improvements;

Fig. 3 is a vertical, transverse section on a somewhat larger scale illustrating one of the separating units of my apparatus;

Fig. 4 is a front elevation of the unit shown in Fig. 3;

Fig. 5 is a cross section taken substantially on the line 5—5 of Fig. 3;

Fig. 6 is a vertical section taken on the line 6—6 of Fig. 2;

Fig. 7 is a detail cross section taken on the line 7—7 of Fig. 3, showing means for removably securing the riffle tables to the machine, and Fig. 8 is a sectional perspective view taken on a vertical plane through a relatively small concentrator machine for treatment of relatively fine articles of material, such as a mixture of black sand and gold particles, to concentrate the valuable and heavier material.

The embodiment of my apparatus illustrated in Figs. 1 to 7 of the drawings is mounted compactly on a large wheeled frame having, as shown, seven separation units supported on each of the longitudinal sides thereof and provided at some distance above said units with a large rotary trommel, which may be constructed of heavy rod or wire netting adapted to break up clods and to screen the smaller material, while discharging the larger rocks from the declined lower end thereof. Trommel T is open at both ends and, as shown, receives earth material from a suitable endless conveyor C.

Earth conditions vary considerably in different locations where valuable metal particles are found in the soil, and where the materials are very coarse or contain large, solid lumps or rocks, it is usually desirable to disintegrate the same with a suitable beater or hammer mill before introducing the same into trommel T. It is often desirable to heat and drive out the relatively small amounts of moisture in the materials and to this end, if desired, the trommel may be provided with gas burners B extending longitudinally thereof and adapted to direct flames against and through the lower portions of the trommel at each side thereof.

Directly below trommel T and extending substantially the full length thereof is a horizontally disposed hopper H for receiving the screened, dry material from the trommel, and this hopper delivers to a pair of semi-cylindrical, horizontal feeding channels 11 extending longitudinally of the machine in side-by-side relation, and each having therein a feeding agitator 12 which may have spirally or radially arranged agitating elements 12a. One of the feeding channels 11 delivers to the several separation units on one side of the machine, while the second channel delivers material to the several units on the opposite side of the machine. As shown, two discharge passages 12b of oblong shape are formed in the feeding channels for each separation unit to obtain a substantially uniform supply of the ore material to the upper end of the inclined unit. Gates 13, as shown, each operating on the two passages 12b for one unit, are provided for the several separation units disposed externally of the feeding channels 11 and each individually operable for opening, closing or adjusting through manually operated means.

Trommel T at its declined end delivers the larger rocks or other valueless large pieces of material which do not pass through the grating to a chute X at the forward end of the machine, which may, if desired, deliver to a removing conveyor, not shown.

Each separation unit includes a flotation or riffle table, designated as an entirety by the letter R, declined from its upper to its lower end and, as shown, of rectangular area and removably mounted in the machine. The riffle table has upstanding vertical sides 14 and an inclined forward end 14a which, when the table is operatively positioned, is disposed just inwardly of the feed gate 13. Each of the removable riffle tables is mounted on an adjustable rectangular frame comprising longitudinal side members 15 which are connected by upper end members 15a and lower end members 15b. It will be noted that the side members 15 taper from their lower to their upper ends. Said adjustable rectangular frames are pivoted on the axes 15c by hinges and the lower ends of said frames are secured in the desired adjusted position by means of slotted links 16 which engage wingnut clamps 16a provided on threaded bolts extending outwardly from the lower frame sides 15. The riffle tables are removably secured to the side members 15 of the adjustable frame by suitable means such as the hinge clamps 18 secured to members 15 and having the overhanging flanges for engagement with the upper edges of the side members 14 of the riffle tables.

Across the bottom of the flotation table frame is secured a reticulated support which preferably is in the form of a stiff wire or rod netting or screen 19, and upon this screen the porous and continuous table top 20 is stretched and supported, preferably constructed of air pervious fabric, such as muslin. The fabric table top 20 covers the entire area of the frame and has mounted transversely thereon a series of spaced riffle bars 21, as shown, constructed of solid material and having upwardly disposed edges extending substantially normal to the top 20 and smooth top faces extending parallel with the top. For securing the riffles 21 similar bars 22 may be provided below the top and supporting netting aligned with the riffles and secured thereto with the netting 19 and top fabric 20 clamped between. At the upper end of the table relatively wide strips 23 clamp the upper portions of the stiff netting 19 and top fabric 20, forming a chute section to receive the falling material from the discharge passages 12b. At the lower end of each riffle table a chute section 24, which may be conveniently constructed of sheet metal extending the full width of the board, is mounted on the lower riffle and delivers the tailings to a shaker separator mechanism, to be later described.

The table-supporting bars 15 are connected at their upper ends by a cross strip 15a and at their lower ends by a wider cross strip 15b, said strips and bars forming a shallow, box-like member which is surrounded at its bottom edge by a flexible bag 25 constructed of impervious sheet material or fabric. The bag 25 at its lower portion and disposed below the lower portion of the riffle table has a mouth or neck 25a which is secured and sealed within a rectangular valve-controlled air intake passage 26. The bag or flexible duct 25 with the shallow box-like supporting frame comprising the bars 15 and cross strips 15a and 15b, defines a chamber below the entire area of the flotation table and in communication therewith throughout the entire area thereof. It will be noted that this chamber decreases in height from the lower portion of the unit to the upper end thereof, and that the flexible bag or duct permits adjustment of the inclination of the table without disconnection of the bag with the air intake passage 26. A transverse baffle plate 27 is secured across the bottom edges of the table-supporting bars 15, being disposed above the air intake passage 26 and extending upwardly for some distance in spaced relation some distance below the flotation table. The lower edge of this transverse baffle is spaced some distance above the lower strip 15b of the box-like support and preferably a slight distance above a line extending parallel to the axis of passage 26 and from the lower edge of said passage this baffle 27, in cooperation with the shape of the air chamber defined below the flotation table, assures approximately uniform distribution of air injected therein to all parts of the area of the riffle table.

Extending longitudinally of the machine below the two series of separating units is a relatively large air chamber or duct 28, as shown, of substantially triangular cross section. This chamber is supplied with air under pressure from one or more blowers 29 disposed, as shown, at one end of the machine and having their discharges connected with one end of said chamber. A series of discharge apertures, one for each of the separating units, are formed in the lower portions of both side walls of the chamber 28 having arcuate valve seats 28a associated therewith and communicating with the air passages 26 which connect the main air chamber 28 with the individual air chambers for each separator unit. A series of rotary segment valves 30 are provided for the respective air passages 26, the respective valves for the separation units mounted on the respective sides of the machine being fixed to rotary shafts 31, said shafts being mounted within the lower portion of the large air chamber 28 in parallel, horizontal relation and journalled on suitable bearings 32 provided for registration of the segment valves 30 with their respective arcuate valve seats. The segment valves 30 for each shaft are staggered to obtain the most advantageous synchronizing and balance for the work desired. As shown, each segment valve 30 is slightly less than 180 degrees of a cylindrical surface whereby the air passage 26 is in full communication with the interior of the large air chamber 28 for approximately the time during one-half a revolution of shaft 31 or slightly less than one-half a revolution. It is important to note that with the rotary segment valves the communication between large air chamber 28 and the chambers below the respective separating units is progressively increased up and to the full open position, and then progressively decreased in the closing movement. The shafts 31 extend through at least one end of the casing forming chamber 28 and are driven from a power take-off connected with an electrical motor or any other source of rotary power.

My separation units each includes, in addition to the main separation mechanism or flotation table, shaker screening mechanism disposed below and receiving the tailings from the riffle tables R. As shown, each of said shaker mechanisms S includes a rectangular, open, box-like frame 33 mounted for vibratory movement, as shown, on a pair of elliptical springs 34 disposed at the respective sides of each box. Springs 34 are mounted on a suitable framework and have their upper leaves secured to the bottom portions of box frames 33. To vibrate and shake the box frames 33 and elements associated therewith, I provide, as shown, eccentrics 35 fixed to rotary shaft 35a, said shafts being journalled in suitable bearings adjacent the ends of the machine and one of said shafts being provided for the series of shaker mechanisms at the respective sides of the machine. Eccentrics 35, as shown, are disposed with their peripheries engaging the underside of the upper leaves of springs 34.

Each shaker mechanism is provided with a pair of spaced screens 36 and 37, respectively, declined slightly from their inner to their outer ends from the horizontal, the upper screen 36 receiving the tailings from the delivery chute 24 of the flotation table. The lower screen 37 is of finer mesh than the upper screen 36 and permits only very fine, granulated, heavy particles, such as black sand and valuable mineral particles, to pass therethrough. As shown, the screens 36 and 37 are each provided with a centrally disposed transverse riffle 38 of substantially the same structure as the riffles 21 utilized in the flotation table. Both screens at their outermost ends deliver to a tailing discharge chute 39 which, as shown, dumps the valueless material on to a suitable tailing conveyor 40. One of said tailing conveyors 40 is provided for each side of the machine, and such conveyors are driven by suitable means (not shown).

Below each of the shaker mechanisms S is provided a hopper 41 for receiving the black sand and fine heavy particles which pass through the screens 36 and 37, and said hoppers are enclosed and connected by a flexible skirt 42 with the lower edge of the shaker box 33 to form an enclosed air chamber below the shaker screen. Hoppers 41 deliver to a common conveyor channel 43, one of said channels being provided for the units at each side of the machine and extending longitudinally and horizontally thereof, and having mounted therein a suitable screw conveyor 44 for moving the granular heavy material received from the several shaker mechanisms at one side of the machine to one of the ends of the machine where the recovered heavy particles, mostly black sand with a very slight amount of gold or metal particles therein, is discharged from spouts 45.

Intermittent pulsations of air are supplied to the chambers formed below the screens 36 and 37 of the shaker mechanisms for removing from the screens the relatively light granular material and for assisting in the travel of the material downwardly over screens 36 and 37, as well as further agitating and producing a flotation of the material received from the riffle table. An air duct 46 is provided for each of the shaker mechanisms S communicating with the upper and inward portion of the shaker hopper 41 and having communication with the large air chamber or tank 28 just below the valve passage 28a. An arcuate valve seat 46a is provided, adapted to cooperate in each instance with the respective segment valves 30 servicing the corresponding flotation mechanism above the respective shaker unit. A flat deflector plate 41A is mounted for adjustment on a horizontal axis and extending forwardly of the air duct 46 within the upper portion of hopper 41 and provided for each unit adapted to vary the directional effect of the air to be distributed against the bottom of screen 37.

The trommel T, feeding agitators 12, rotary valve shafts 31, eccentric shafts 35 and conveyors 44 are driven in conventional manner from suitable sources of rotary power. It is desirable to provide a separate source of power for the trommel T, such as an electric motor (not shown), a separate motor 47 for driving the blowers 29. The other driven parts may be driven from a countershaft connected through, as shown, a transmission mechanism to another motor 48. It will, of course, be understood that any suitable source or sources of power may be provided for driving the working parts, it being preferred in land where dust is prevalent to provide a dustproof or enclosed internal combustion engine with electrical generator connected thereto supplying electricity for dustproof electric motors mounted on the machine.

*Operation*

Loose ore material in substantially dry condition is screened through the peripheral grating of trommel T and supplied from the hopper H to the feeding channels 11 which agitate the material and cause substantially a uniform feeding of the same to the upper ends of the flotation tables through the two passages 12b provided for each separation unit. The ore material, as it is delivered and spread out on the upper area of the flotation or riffle tables R, is subjected to intermittent and uniformly distributed quantities of air under pressure, said air passing upwardly through the entire uncovered areas of the porous fabric top 20 and such intermittently applied air being gradually increased in upward pressure and intensity through the progressively opening and closing action of the rotary segment valves 30. The declination of the riffle tables and the upward rising of the air with the widely spaced, transverse riffles, produce a true and continuous flotation in wave form of the ore materials treated, the lighter materials and particles being suspended and flowing progressively downward over the top of the several riffles while the heavier and valuable particles sink to the bottom strata and are engaged and retained by the successive riffles. The almost continuous wave-like flotation action produced through the cooperation of the air controlling and directing means in cooperation with the continuous fabric table top recovers on the flotation tables by actual tests over 95% of the gold or other valuable mineral content of the ore treated.

During the process and without stopping the working parts of the machine, the gate for any one of the respective flotation units may be closed and the riffle table removed and the separated and recovered heavy materials dumped from the riffles into a container.

During the process the tailings from the flotation tables are delivered to the upper and coarser screen 36 of the associated shaker mechanism and here such materials are shaken and agitated through the combined action of the resiliently mounted and agitated boxes 32 and the intermittent action of upwardly directed air through said screens. Such action on the tailings causes the light, granular material to be prevented from passing through the screens, as well as causes the downward travel of the larger valueless material while agitating the heavier particles with any gold "flour" or small metal particles and causing such to work downwardly, passing through the screens 36 and 37 and dropping into the hopper 41 for recovery. Such recovered heavy particles are then removed by the conveyor 44 to one end of the machine and discharged from the spouts 45 and collected for later concentration. The valueless tailings from the shaker mechanism are removed by tailing conveyors 40, and in tests have been shown to contain substantially no gold particles or "flour." In the flotation and separation action the fabric tops of the riffle boards offer sufficient friction to prevent skidding or undue sliding of the material.

Referring now to the embodiment or concentrator illustrated in Fig. 8, a box-like casing 50 is provided having an open top and a fan chamber 51 formed in the bottom portion thereof. A fan of the blower type is mounted in chamber 51 having its tangentially disposed discharge communicating with a rather narrow, horizontal duct 52 disposed below a substantially horizontal partition 53 formed within the casing. Air to the fan chamber 51 is controlled by means of a hinged gate 54 mounted in an intake passage at the forward end of the chamber, said gate, as shown, being adjustable by a rod 54a from outside of casing 50.

The narrow air discharge duct has its upper wall provided with a plurality of air distribution apertures 53a through which air under pressure rises and is further diffused by passage through a second horizontal partition 55 disposed in spaced relation some distance above partition 53 and having formed therein a multiplicity of air apertures 55a more or less uniformly spaced throughout the area of partition 55. A third apertured partition 56 of the general structure of partition 55 is spaced in the upper portion of said casing some distance below a riffle table 57 which is declined somewhat from its receiving end to its delivery end 57a. Table 57 is supported on a reticulated or grate-like supporting plate and has a porous, preferably fabric top 58 which may be conveniently made of muslin or other suitable flexible fabric. A series of small, transverse riffles 59 are secured to the top of the riffle table and operate to retain the heavier particles while permitting passage and flotation of most of the black sand and other materials lighter than gold or the heavy metal particles desired to be recovered.

In this concentrator embodiment the source and supply of air is substantially continuous, although a somewhat pulsating effect is obtained by utilizing a blower of a multi-blade type. The function of the several air distributing partitions 53, 55 and 56 with the inclined riffle table, produces an efficient flotation action and successful results have been obtained in concentrating the valuables recovered from separation apparatus.

From the foregoing description it will be seen that I have provided an apparatus and method for obtaining a true flotation with continuous downward flow of the lighter and valueless earth materials with a separation of substantially all of the heavy mineral particles such as finely divided gold and gold "flour." It will further be seen that through the cooperation of the air distribution chamber below the riffle tables with the construction of such tables and the means for progressively controlling the entrance of air together with the porous, preferably fabric tops having minute pores throughout the entire area thereof, a substantially continuous, wave-like flotation over the riffles is obtained. The device has proved itself highly successful for separation of gold particles in areas where wet placer mining is impractical.

In the operation of my apparatus pulsations of air are not only utilized to effect the true flotation principle, but as controlled and distributed in my apparatus produce aeration of the materials from the entire separation process, thus preventing particles containing slight amounts of moisture from clinging together and thereby losing some of the valuable heavier particles.

It will, of course, be understood that various changes may be made in the form, details, arrangements and proportions of the various parts and also in the method and steps for carrying out the same, without departing from the scope of my invention.

What is claimed is:

1. In apparatus for dry separation of heavy mineral particles from ore material, a rectangular riffle table, the upper side of which is subjected constantly to only atmospheric pressure, said table having an inclined substantially flat top constructed throughout of air pervious flexible sheet material, a substantially rigid netting supporting said top flatwise, a series of riffle ribs extending across said top transversely of the normal direction of travel of said ore material, means for continuously and uniformly introducing ore material across the entire width of the upper end of said riffle table, a rectangular air chamber below said top substantially co-extensive in area with said top and communicating at its upper portion with the entire area of said top, the space in said chamber for some distance below said top being unobstructed, an upwardly extending air entrance communicating with the bottom of said chamber, said chamber tapering in height from the area above said air entrance to the portions thereof adjacent the upper end of said riffle table, a baffle plate disposed in said air chamber and extending upwardly from a point adjacent to said air entrance for causing uniform distribution of air against the bottom of said riffle table top, a power source of continuous air supply under pressure, and a valve for suddenly and intermittently connecting the full volume of said source with the full cross sectional area of said air entrance.

2. In apparatus for dry separation of heavy mineral particles from ore material, an elongated storage chamber for reception of air under pressure, a plurality of rectangular riffle tables mounted in side by side relation above said chamber, said chamber extending substantially the aggregate widths of said tables, said riffle tables having their upper sides subjected constantly to only atmospheric pressure and having an inclined flat top constructed throughout of air pervious flexible sheet material, means for supporting said top, a series of narrow riffle ribs extending across said top transversely of the normal direction of travel of said ore material, means for continuously and uniformly introducing ore material across the entire width of the upper end of each of said riffle tables, a rectangular air distribution chamber below the top of each of said riffle tables substantially co-extensive in area and communicating at its upper portion with the entire area of said top, the space in said chamber for a short distance below said top being unobstructed, a short upwardly extending air duct for each of said distribution chambers communicating with the lower portion thereof from said storage chamber, baffle means in the lower portion of said distribution chamber above said entrance duct for causing substantially uniform air distribution against substantially the entire bottom area of said table and a series of fast-operating rotary segment valves mounted in said storage chamber, one for each of said air ducts, staggered in operative relation for suddenly, intermittently and successively connecting the full volume of said source of compressed air in said storage chamber with the full cross sectional area of said respective air entrances to said riffle tables.

ANDREW E. ROTHGARN.